United States Patent
Lee et al.

(10) Patent No.: US 10,963,030 B2
(45) Date of Patent: Mar. 30, 2021

(54) METHOD AND APPARATUS FOR DISPLAYING AN IMAGE FROM A COMMUNICATIONS DEVICE

(71) Applicant: MOTOROLA SOLUTIONS, INC, Chicago, IL (US)

(72) Inventors: Wai Mun Lee, Ipoh (MY); Wooi Ping Teoh, Georgetown (MY); Chun Wen Ooi, Georgetown (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 226 days.

(21) Appl. No.: 16/390,061

(22) Filed: Apr. 22, 2019

(65) Prior Publication Data
US 2020/0333865 A1 Oct. 22, 2020

(51) Int. Cl.
| | | |
|---|---|---|
| *G06F 1/26* | (2006.01) | |
| *G06F 1/32* | (2019.01) | |
| *G06F 1/3203* | (2019.01) | |
| *G06F 1/16* | (2006.01) | |
| *H04B 1/3888* | (2015.01) | |

(52) U.S. Cl.
CPC .......... *G06F 1/3203* (2013.01); *G06F 1/1626* (2013.01); *H04B 1/3888* (2013.01)

(58) Field of Classification Search
CPC ........ G06F 1/163; G06F 1/165; G06F 1/1626; G06F 1/1632; G06F 1/3203; G06F 1/3206; G06F 1/3262; G06F 1/3265; G06F 1/3287; G06F 3/0393; G06F 2200/1633
See application file for complete search history.

(56) References Cited

U.S. PATENT DOCUMENTS

| | | |
|---|---|---|
| 5,452,829 A | 9/1995 | King et al. |
| 7,466,994 B2 | 12/2008 | Pihlaja et al. |
| 8,382,294 B2 | 2/2013 | Hua et al. |
| 9,264,589 B2 | 2/2016 | Graham |
| 10,592,042 B1 | 3/2020 | Lee et al. |
| 2006/0146011 A1 | 7/2006 | Pihlaja et al. |
| 2011/0267257 A1* | 11/2011 | Hua ..................... G06F 1/1626 345/1.1 |
| 2012/0170177 A1* | 7/2012 | Pertuit .................. G06F 1/1684 361/679.01 |

(Continued)

FOREIGN PATENT DOCUMENTS

WO 2018033903 A1 2/2018

OTHER PUBLICATIONS

The International Search Report and the Written Opinion corresponding patent application No. PCT/US2020/024604 filed: Mar. 25, 2020, dated Jul. 8, 2020, all pages.

*Primary Examiner* — Nitin C Patel

(57) ABSTRACT

A holster is provided to receive a radio (mobile communications device). The radio is operatively equipped with a front-facing touchscreen. The holster is equipped with an optical reflector. The optical reflector is adapted to change the direction of light rays passing through it in order to reflect only a portion of the front-facing touchscreen to a top window located within the holster. The top window and the touchscreen are substantially perpendicular to each other. The holster is equipped with at least one capacitive touch extension element that couples the top window to a point on the touchscreen to control an interface element on the touchscreen.

9 Claims, 9 Drawing Sheets

(56) References Cited

U.S. PATENT DOCUMENTS

| | | | |
|---|---|---|---|
| 2012/0212430 A1* | 8/2012 | Jung | H04M 1/72454 |
| | | | 345/173 |
| 2013/0088410 A1* | 4/2013 | Hill | H04M 19/04 |
| | | | 345/1.1 |
| 2013/0181935 A1* | 7/2013 | Mckenzie | G06F 3/0445 |
| | | | 345/174 |
| 2014/0332441 A1* | 11/2014 | Jayetileke | H04B 1/3888 |
| | | | 206/774 |

* cited by examiner

METHOD AND APPARATUS FOR DISPLAYING AN IMAGE FROM A COMMUNICATIONS DEVICE

RELATED APPLICATIONS

The present application is related to with application Ser. No. 16/390,067, now U.S. Pat. No. 10,592,042 issued on Mar. 17, 2020 (Docket No. PAT24290) filed on the same date as the present application.

BACKGROUND OF THE INVENTION

Conventional two-way portable radios are usually designed with a main display on a front panel to provide essential information to a user. Generally, the portable radio is carried in a holster or held by a belt clip. To view displayed information, the user must remove the radio from the holster or disengage the belt clip. Public safety personnel, such as fire fighters, police officers, rescue members, and the like, often wear gloves and other safety equipment that can make it difficult to remove the radio from the holster or disengage the belt clip.

For example, during a mission critical task, the user may not be able to remove safety gloves to pull the radio from the holster or disengage the belt clip. Thus, two-way radio users especially those working in public safety and mission critical tasks would benefit from a display interface which provides information at a quick glance, without having to remove the radio from the holster or belt clip.

U.S. Pat. No. 8,382,294 attempts to solve the above-mentioned problem by providing a radio that can channel a portion of the display to a top window so that the user does not have to remove the radio from a belt in order to see information displayed on the radio. However, the '294 patent has several drawbacks. Firstly, radios of today typically utilize a touch-screen, with the user interacting with interface elements displayed on the touchscreen. There is no current way for a user to interact with such interface elements using the top window. Secondly, if a radio is not worn on the belt, the bulky top display is not needed.

Therefore, it would be beneficial if a top display could be utilized which could control interface elements on a touch-screen of the radio, and also be removable for when a user does not carry the radio on a belt.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

In order to address the above-mentioned need, a holster is provided to receive a radio (mobile communications device). The radio is operatively equipped with a front-facing touchscreen. The holster is equipped with an optical reflector. The optical reflector is adapted to change the direction of light rays passing through it in order to reflect only a portion of the front-facing touchscreen to a top window located within the holster. The top window and the touchscreen are substantially perpendicular to each other. The holster is equipped with at least one capacitive touch extension element that couples the top window to a point on the touchscreen to control an interface element on the touchscreen.

Figure 1:
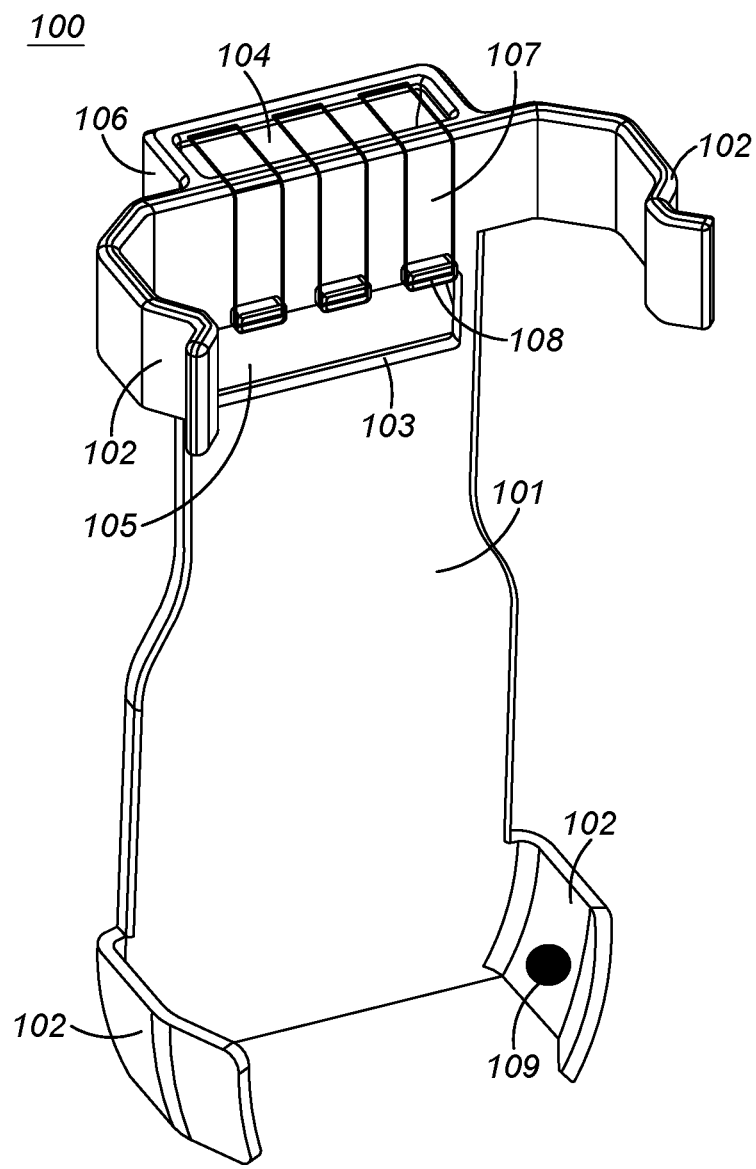
FIG. 1 illustrates a holster.

FIG. 1 illustrates holster 100 for carrying a communications device on the person (as on the hip or chest), on a saddle, or in a vehicle. As shown, holster 100 comprises peripheral wall 101 coupled to attachment components 102. To secure the attachment components 102 with the communications device, the attachment components 102 generally corresponds in shape to the outline of the communications device it is designed to fit around. It should be noted that other attachment means may be utilized to secure holster 100 to a communications device, so long as the communications device is removable from the holster.

To provide visual access to the touchscreen on the communications device, a first aperture (window) 103 is disposed in peripheral wall 101. Aperture 103 can have any suitable size and shape such as, for example, rectangular. In the illustrated embodiment, when the communications device is holstered, the first aperture 103 is located proximate to a portion of a touchscreen on the communications device. Light from the portion of the touchscreen passes through first aperture 103, off of mirror 105, and through second aperture 104, to be seen by a user.

Second aperture 104 is provided on a top portion of holster 100 existing within housing 106. Second aperture 104 exists through a surface that is substantially perpendicular to a surface having first aperture 103, and faces upward towards a user when holster 100 is worn on a belt. Both first aperture 103 and second aperture 104 may comprise a transparent surface such as glass or plastic, so that apertures 103 and 104 may be thought of as "windows", through which, light can pass. These windows are perpendicular to each other.

To align the touchscreen on the communications device to second aperture 104, optical reflector 105 is positioned between first aperture 103 and second aperture 104. Optical reflector 105 has a surface that is positioned approximately 45 degrees to first aperture 103, and 45 degrees from second aperture 104 (i.e., 45 degrees to surfaces holding first and second apertures). Optical reflector 105 can change the direction of light rays that reflect off of it. The materials, shape and/or coatings of optical reflector 105 can be selected to alter the normally linear path of a light ray incident upon the reflector by changing its angular direction.

To align optical reflector 105 with the touchscreen on the communications device to direct the reflected portion of the touchscreen through second aperture 104, holster 100 includes reflector housing 106 that is attached to an outer surface of holster 100. Housing 106 is generally hollow with walls spaced to accommodate optical reflector 105 and both apertures 103 and 104.

Finally, conductive strips 107 and conductive pads 108 are provided on holster 100. Conductive strips 107 begin on window 104 and terminate at pads 108. Conductive pads 108 serve to make contact with a touchscreen on a communications device. Conductive strips 107 may lie over at least a portion of window 104. Both conductive strips 107 and conductive pads 108 are utilized to channel a conduction of a finger contact near/on window 104 to a touchscreen on a communication device. Conductive strips 107 and pads 108 are preferably transparent and comprise ITO (Indium Tin Oxide). ITO is common in touch panels since it is transparent and able to conduct electricity.

Figure 2:
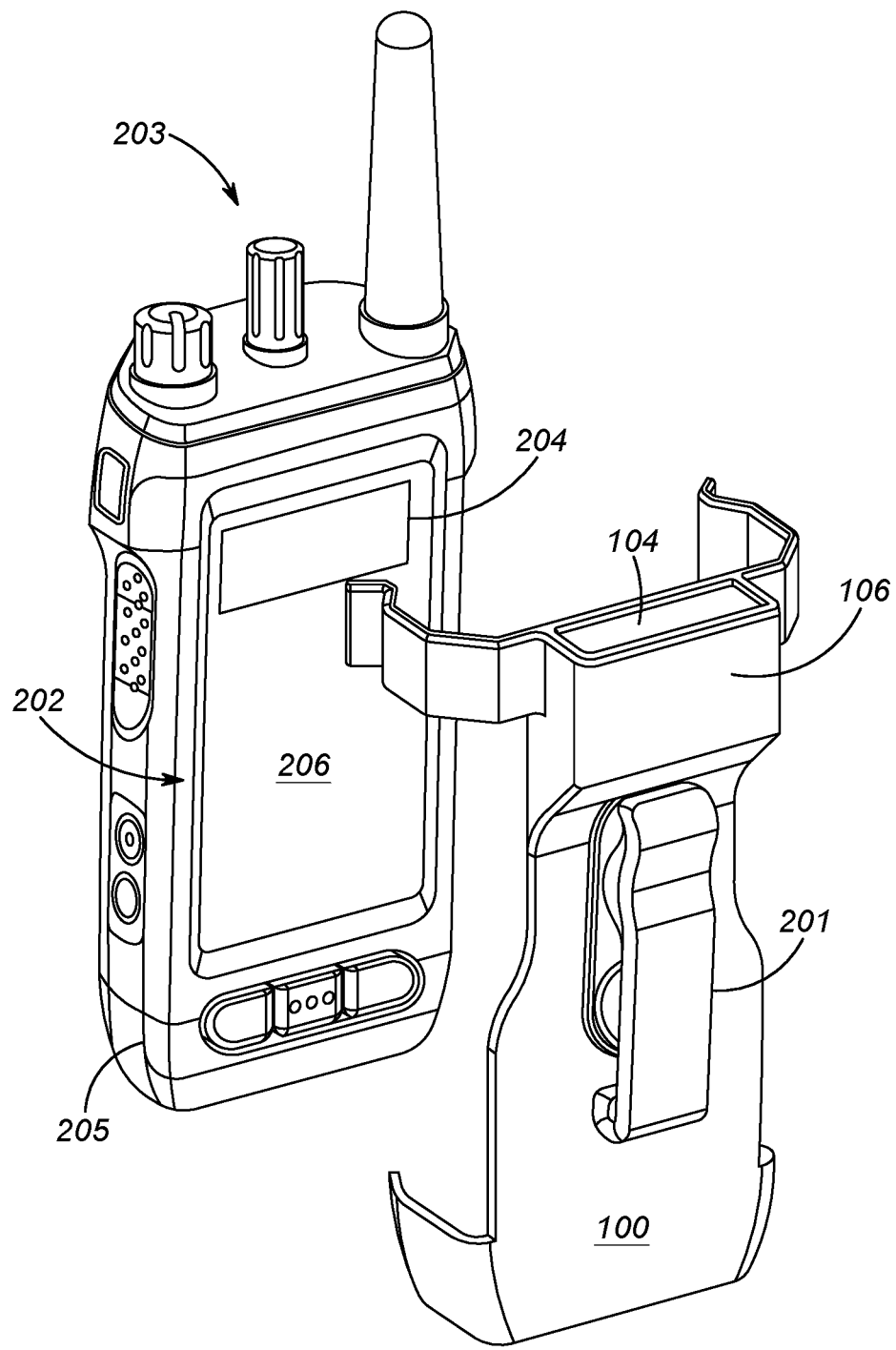
FIG. 2 shows a holster and a radio.

FIG. 2 shows holster 100 along with communications device 203. It should be observed that holster 100 is designed to display portion 204 of touchscreen 202 through window 104. In particular, an image from a first portion 204 of a display 202 is visible by looking through window 104. This is accomplished by holster 100 reflecting the image from the first portion 204 of touchscreen 202 by positioning reflecting surface 105 between windows 103 and 104. The orientation of the reflecting surface is such that light from first portion 204 enters window 103, and is reflected through window 104.

Holster 100 also comprises clip 201 configured to clip over a belt.

Communication device 203 may be a portable radio, a radio, a body-worn camera, a mobile device, a Personal Digital Assistant (PDA), or the like. Communication device 203 includes housing 205 designed to receive holster 100. Communication device 203 in accordance with an embodiment has touchscreen 202 coupled to the housing 106. Touch-sensitive displays (also known as "touchscreens") are well known in the art. Touchscreens are used in many electronic devices to display control buttons, graphics, text, and to provide a user interface through which a user may interact with the device. A touchscreen detects and responds to contact on its surface. A device may display one or more control buttons, soft keys, menus, and other user-interface elements on the touchscreen. A user may interact with the device 203 by contacting the touchscreen at locations corresponding to the user-interface (UI) elements with which they wish to interact.

As described, touchscreen 202 may be divided into two portions or areas; first portion/area 204 and second portion/area 206. In one embodiment, the second portion/area 206 may be thought of as everything outside of first portion/area 204. When holster 100 is attached to device 203, first portion 204 of the display 202 is visible to a user through window 104. Second portion 206 of the display 202 is not directly visible to the user when holster 100 is attached to device 203. Because of this, one or more second portion 206 of the display is operated in a low-power state when holster 100 is attached to device 203. When holster 100 is attached to radio 203, the image displayed on first portion 204 of display 202 is an inverted image to account for the fact that the view of the image through holster 100 is off a reflecting surface.

Figure 3:
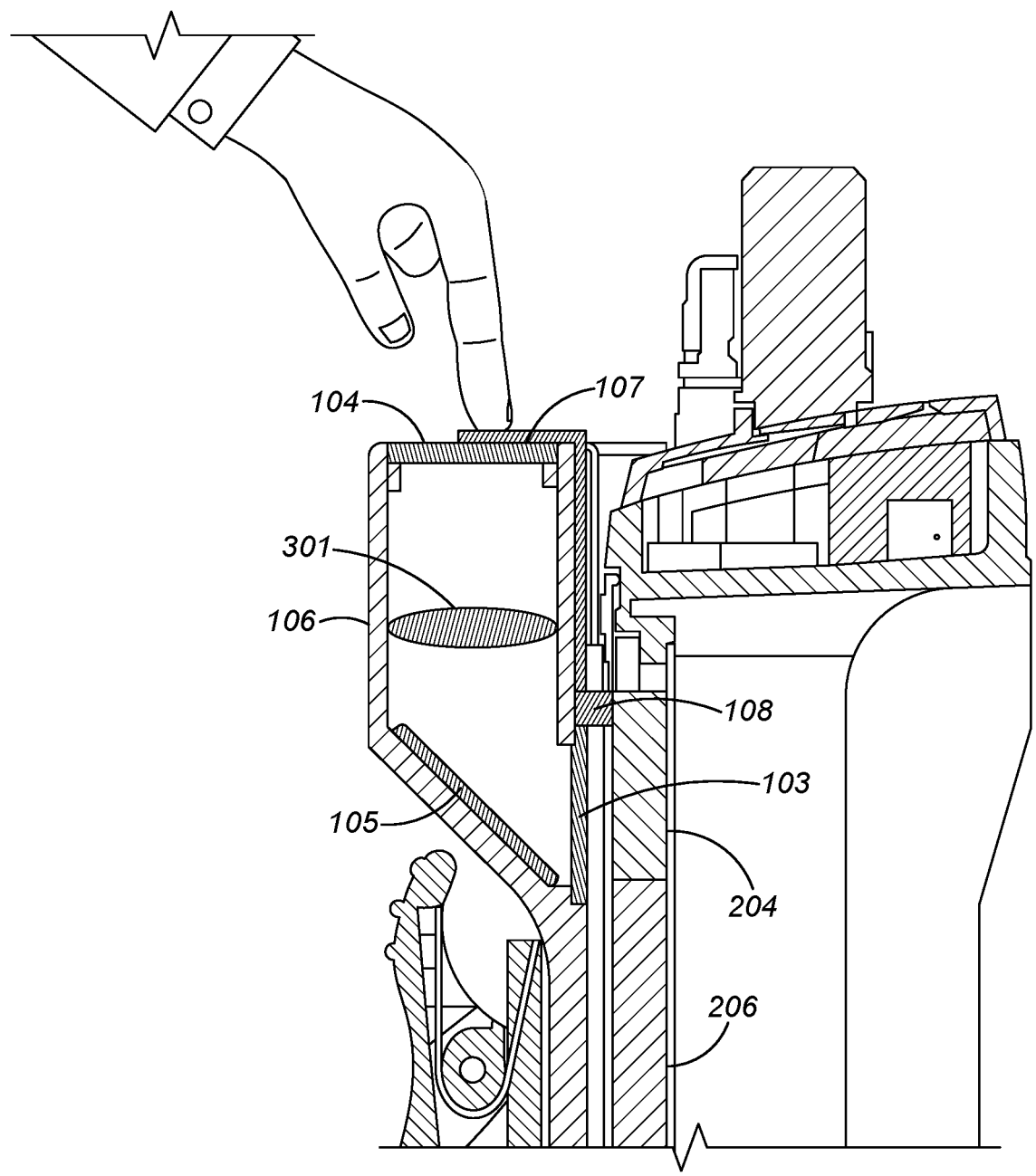
FIG. 3 is a cutaway view of a holster attached to a radio.

FIG. 3 is a cutaway view of holster 100 attached to device 203. As described above, conducting element 107 and pad 108 are arranged such that a finger contact to conductive element 107 (on or near window 104) will cause a capacitance change to element 107 and pad 108, causing touchscreen to sense a capacitance change on its surface. The location of the sensed capacitance change on the surface of the touchscreen is at the location where pad 108 makes contact with the touchscreen.

As shown, reflecting element 105 is placed proximate to first portion 204 of the touchscreen. The first portion 204 is reflected such that a user looking through window 104 will be able to see first portion 204. Lens 301 may be located between window 104 and reflector 105 to better focus first portion 204 for a user.

Figure 4:
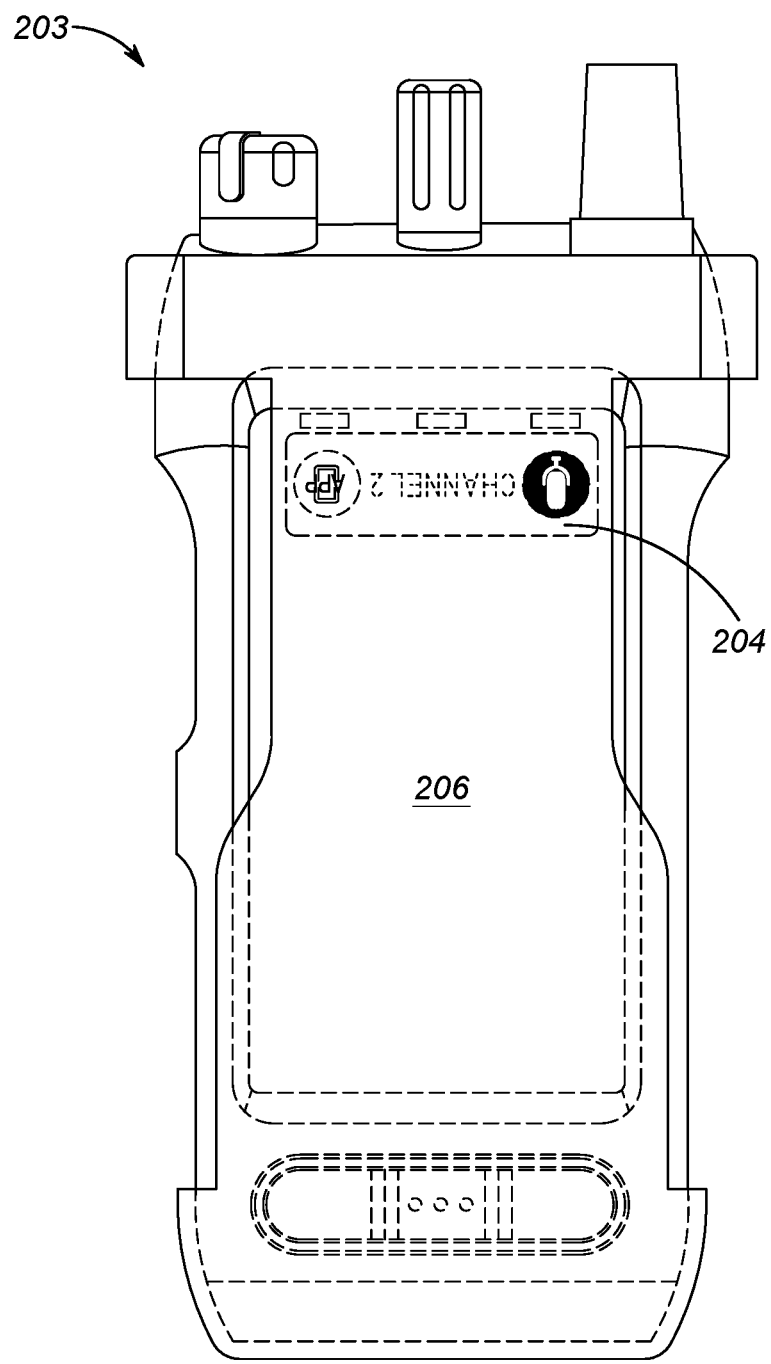
FIG. 4 illustrates a radio.

In FIG. 4, communication device 203 is shown without holster 100 attached, however, for illustration purposes, touchscreen 202 is shown operating as if holster 100 is attached to device 203. Thus, first portion 204, and second portion 206 of the touchscreen 202 are shown as it would appear if holster 100 were attached. As is evident, first portion 204 is illuminated with several user interface elements, while second portion 206 is powered off (nothing is displayed) or operated in a low-power state.

Figure 5:
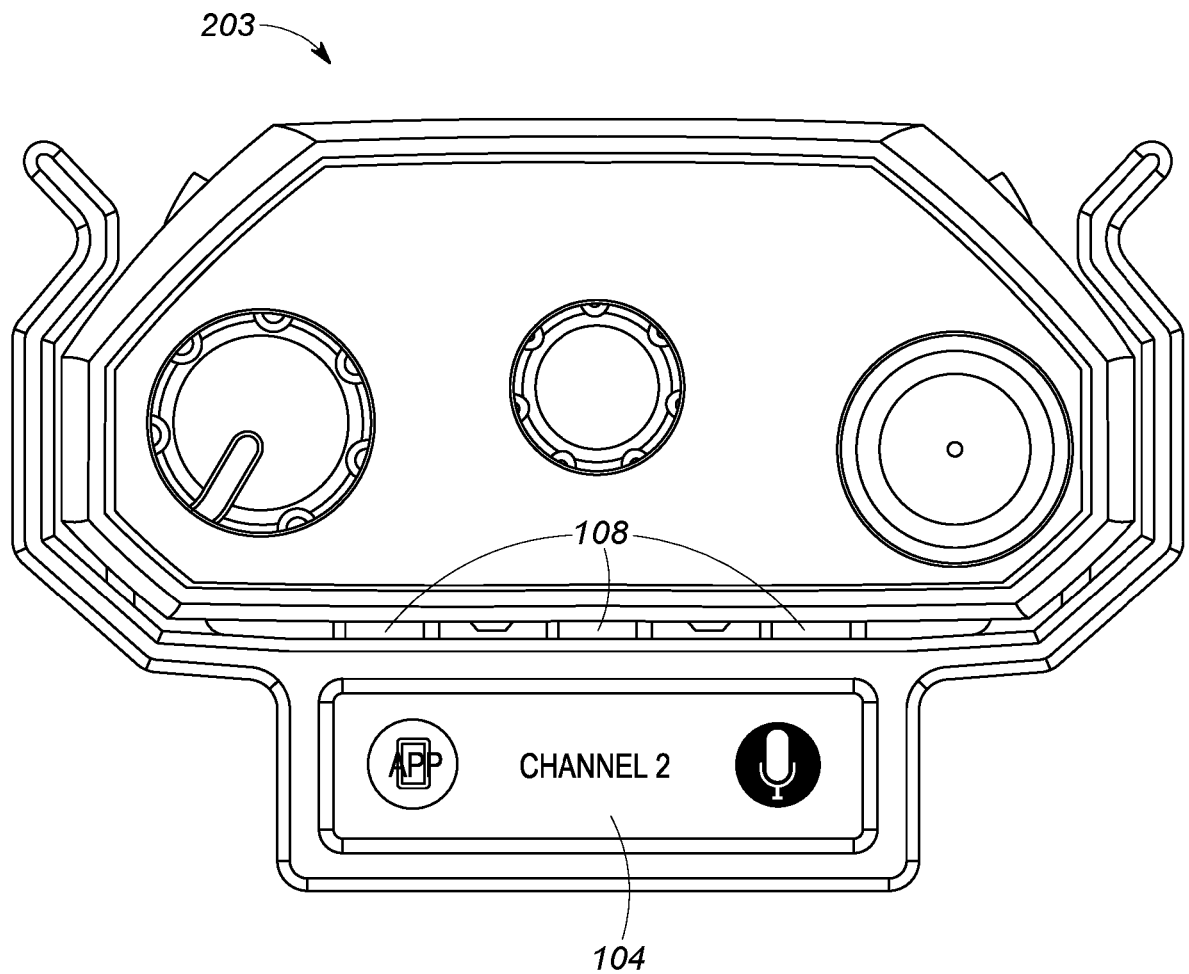
FIG. 5 is a top view of a radio attached to a holster.

As shown in FIG. 5, first portion 204 of the touchscreen is displayed through window 104 when holster 100 is attached. With three conductive pads 108 touching the touchscreen, a user can access interact with three spots on the touchscreen to control three user interface elements (applications, electronic buttons, . . . , etc.) existing near the three contact points between pads 108 and the touchscreen.

As discussed, in one embodiment of the present invention, communication device 203 will switch to a low-power state when connected to holster 100. More specifically, since second portion 206 will be invisible to a user when holster 100 is attached to device 203, no information will need to be displayed on second portion 206 of the touchscreen. Thus, second portion 206 of the touchscreen will power down when holster 100 is attached to device 203.

The low-power state that is entered upon holster 100 being attached may also comprise various processors within device 203 entering a low-power state. For example, all application processors (APs) may enter a low-power state when holster 100 is attached. In this low-power state, baseband processors (BPs) may remain in a powered-up state. (BPs comprise the processors necessary to control communications within device 203. Such processors control transmitters and receivers necessary for communication).

In addition, when holster 100 is attached to device 203, various user interface elements will be repositioned so that they are visible through window 104. This will preferably be near each conductive pad 108. So, for example, if three conductive pads 108 exist, then three interface elements will be placed near the three conductive pads 108, such that each conductive pad 108 serves to channel a touch from a user (onto window 104) to the touchscreen near the interface element controlled by conductive pad 108. This is illustrated in FIG. 6.

Figure 6:
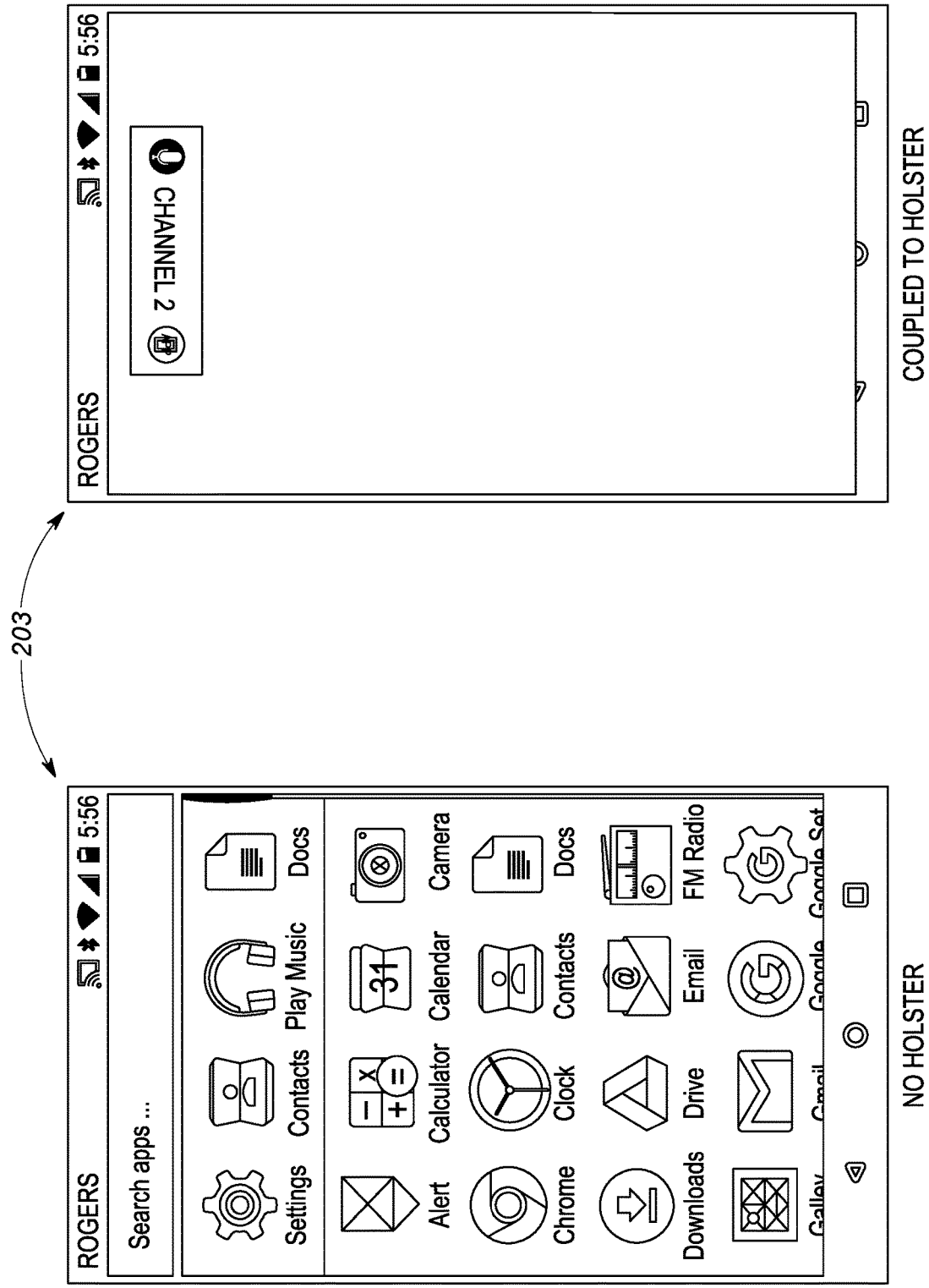
FIG. 6 illustrates a display on a radio.

As shown in FIG. 6, when device 203 is not coupled to holster 100, device 203 has many interface items displayed on both first portion 204 and second portion 206 of touchscreen 202. When coupled to holster 100 (holster 100 not shown in FIG. 6), device 203 has no interface items displayed in second portion 206 of touchscreen 202, and has a few critical interface items displayed in first portion 204 of touchscreen 202. The interface items displayed after coupling device 203 to holster 100 may be interface items that were originally displayed in another location on the touchscreen, then moved to the first portion 204. Alternatively, the interface items displayed after coupling device 203 to holster 100 may be interface items that were originally displayed in second portion 206 on the touchscreen, then moved to the first portion 204. Alternatively, the interface items displayed after coupling device 203 to holster 100 may be interface items that were originally not displayed on the touchscreen, then displayed on the first portion 204 after device 203 is coupled to holster 100.

Thus, as described above, the attachment of holster 100 to device 203 causes device 203 to enter a low-power state, and also causes device 203 to rearrange interface elements (icons) on the touchscreen so that various high-priority interface elements are placed within first portion 204 of the touchscreen. The number of interface elements within second portion corresponds to the number of conductive pads 108 in contact with the touchscreen. So for example, if three conductive pads 108 are in contact with the touchscreen, then three user interface elements will be repositioned into the first portion 204 of the touchscreen.

As is evident, device 203 will need a mechanism to determine when holster 100 is attached to it so that it may rearrange interface elements as discussed above, and enter a low-power state. In order to accomplish this task, device 203 is configured with a magnetic switch that detects the presence of magnet 109. Holster 100 is equipped with magnet 109 that engages the magnetic switch when holster 100 is coupled to device 203. Although magnet 109 is shown existing in a particular area of holster 100, one of ordinary skill in the art will recognize that magnet 109 may exist anywhere on holster 100 so long as the magnetic switch is engaged when holster 100 is coupled to device 103.

During operation, holster will have magnet 109 incorporated on its surface. Magnet 109 serves as a trip to a switch (switch trip). When the magnetic switch detects magnet 109, the apparatus will exit a high-power state and enter a low-power state. When magnet 109 is not detected by device 203, device 203 again enters a high-power state. Thus, magnet 109 is configured and located to cause device 203 to enter a low-power state upon its detection. The low-power state preferably comprises a state where the second portion of display is off, and not displaying any information, or alternatively, displaying minimal information compared to when the display is in a higher-power state (awake).

The detection of magnet 109 also causes device 203 to rearrange user interface elements on its touchscreen as described above. Thus, magnet 109 is configured and positioned to cause device 203 to rearrange interface elements upon its detection.

The detection of magnet 109 may also cause device 203 to power down certain processors. For example, an application processor (AP) typically is the primary driver for the front touch display while a baseband processor (BP) is only responsible for the low power processing application. In a typical operation mode, the AP is running and driving the front touch display. Once the radio is placed in the holster where the magnet is detected, the AP will be turned in sleep mode while the BP will take over the control of the display interface for top display purposes.

FIG. 1 through FIG. 6 show a holster comprising a shell (101, 102) configured to engage a communications device (203) and be removed from the communication device. A first window (103) is provided with a second window (104) substantially perpendicular to the first window. A reflecting element (105) is disposed between the first and the second windows. A conductive runner (107) is provided existing between the first and the second windows and terminating at a conductive pad (108). As discussed, the conductive pad is designed to make contact with a touchscreen (202) when the shell is engaged to the communications device.

The conductive runner may sit on the surface of window 104. A switch trip (109) is provided and configured to engage a switch (708) on the communications device, causing the communications device to rearrange information elements on the touchscreen.

The switch trip (109) may also be configured to engage a switch (708) on the communications device, causing the communications device to enter a low-power state. As discussed, the low-power state may power down a second area (206) of the touchscreen, and/or power down an applications processor within the communications device.

The switch trip (109) may also be configured to engage a switch (708) on the communications device, causing the communications device to interpret a touch not on an information element to engage the information element. In other words, the switch trip (109) may be configured to engage a switch (708) on the communications device, causing the communications device to interpret a touch to a first area of the touchscreen as a touch to an information element existing on a second area of the touchscreen.

Figure 7:
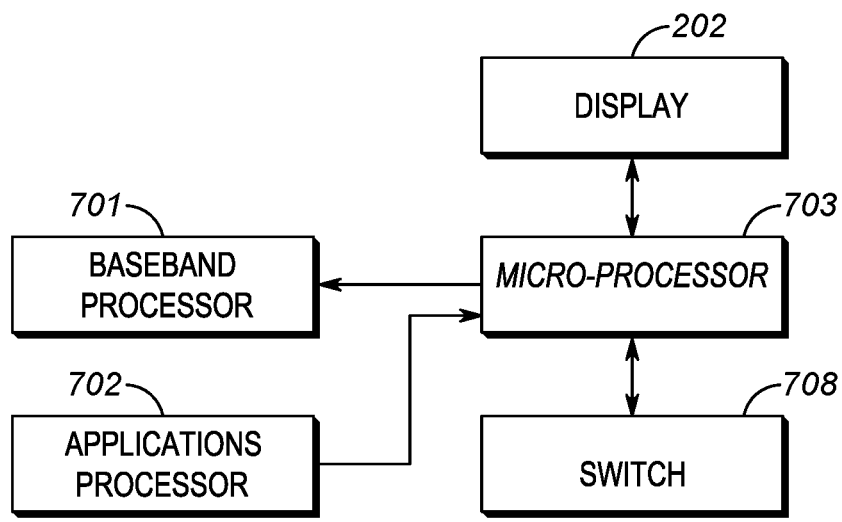
FIG. 7 is a block diagram of a radio.

FIG. 7 is a block diagram of device 203. Device 203 comprises magnetic switch 708, baseband processor 701, applications processor 702, display 202, and logic circuitry 703. As discussed above, magnetic switch 708 comprises a switch that detects the presence of a magnetic field. More particularly, switch 708 is configured to detect the coupling of holster 100 with device 203 by detecting the presence of magnet 109.

Baseband processor 701 comprises a low power, low processing processor, for example, a Texas Instrument OMAP L138 processor, while applications processor 702 comprises a high power processor, for example a Qualcomm MSM8953 processor.

Logic circuitry 703 preferably comprises a microprocessor/controller that controls the functionality of device 203. More particularly, logic circuitry 703 determines that holster 100 has been coupled to device 203. Logic circuitry 703 then causes icons to be rearranged on display 202 as discussed above, and causes operating display 202 in a low-power state. Logic circuitry 703 may also cause the powering down of applications processor 702 so that processor 702 is operating in a low-powered state.

If logic circuitry 703 detects that holster 100 has been uncoupled from device 203, then logic circuitry 703 then causes icons to be rearranged on display 202 as discussed above, and causes operating display 202 in a high-power state. Logic circuitry 703 may also power up applications processor 702 so that processor 702 is operating in a high-powered state.

FIG. 7 provides for a communications device comprising a touchscreen, a housing configured to engage a holster, and a switch configured to determine that the housing is engaged with the holster. Logic circuitry is provided and configured to operate the communications device to rearrange information elements on the touchscreen at a time when the housing is engaged with the holster, the logic circuitry also configured to operate the communications device to again rearrange information elements on the touchscreen at a time when the housing is disengaged with the holster.

As discussed, the logic circuitry can also be configured to operate the communications device in a low-power state at a time when the housing is engaged with the holster, the logic circuitry also configured to operate the communications device in a high-power state at a time when the housing is disengaged with the holster.

The communications device also comprises an applications processor, wherein the low-power state powers down an applications processor within the communications device.

The logic circuitry can also be configured to operate the communications device by interpreting a touch not on an information element to engage the information element when the housing is engaged with the holster, the logic circuitry can also be configured to operate the communications device by interpreting a touch on the information element to engage the information element when the housing is disengaged with the holster.

The logic circuitry can also be configured to operate the communications device by interpreting a touch to a first area of the touchscreen as a touch to an information element existing on a second area of the touchscreen when the housing is engaged with the holster, the logic circuitry can also be configured to operate the communications device by interpreting a touch on the information element as a touch to engage the information element when the housing is disengaged with the holster.

Figure 9:
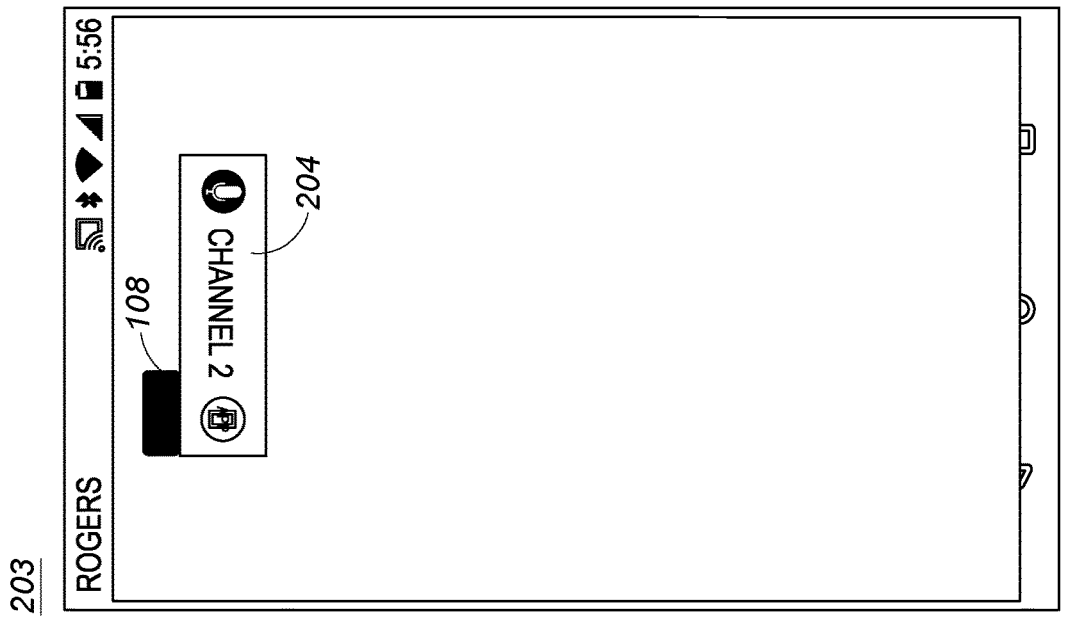
FIG. 9 illustrates a touchscreen display on a radio.
Figure 8:
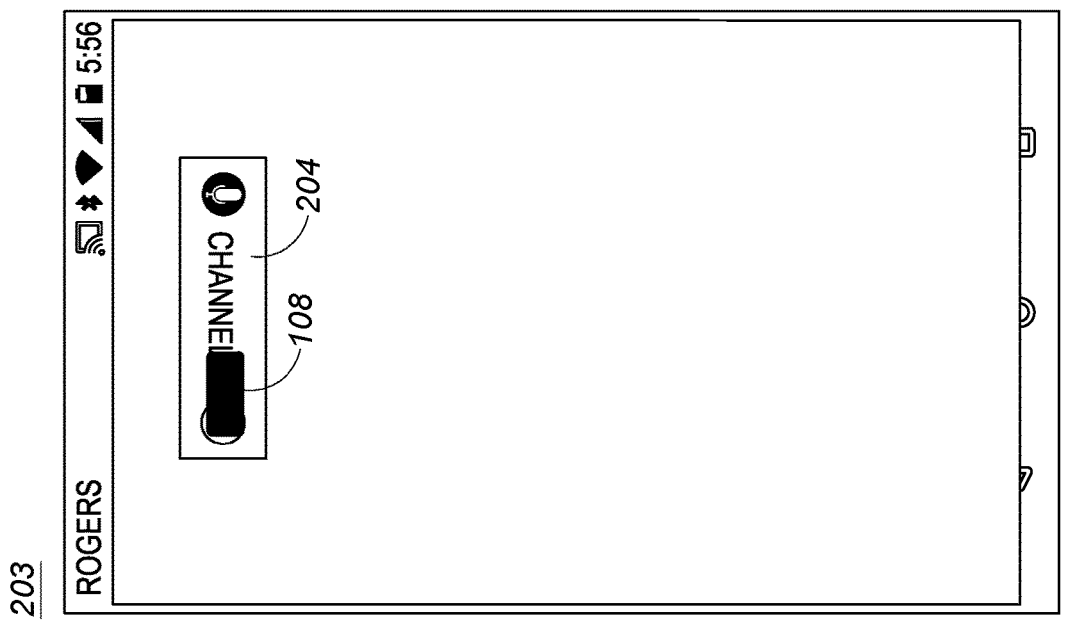
FIG. 8 illustrates a touchscreen display on a radio.

It should be noted that if conductive pads 108 lie over any interface element they wish to couple to, pads 108 may visually block any information element that lies within first area 204 of touchscreen 202. Therefore, if conductive pads 108 terminate on top of the information element within first area 204, they may block them from being seen in window 204. This is illustrated in FIG. 8, with conductive pad 108 terminating within first area 204. In order to address this issue, conductive pad 108 may terminate near first area 204, or not within first area 204, or within second area 206. This is shown in FIG. 9.

As is evident in FIG. 9, conductive pad 108 now terminates outside area 204, but will still control the information element directly below it. Because of this, logic circuitry 703 will need to interpret a "touch" to the touchscreen at the point of conductive pad 108 with a particular information element within first area 204. In other words, when holster 100 is coupled to device 203, logic circuitry will need to interpret a touch to a point near an information element as contact to the information element. The area that controls each information element is predefined prior to implementation of the present invention. This results in a touch near the information element engaging the information element when holster 100 is attached to device 203. It should be noted that only a touch on the information element will engage the information element when holster 100 is not attached to device 203.

Thus, as shown, an information element (e.g., an icon that controls an application) is displayed on a touchscreen. A touch to an area that does not comprise the information element will be used to control the information element. In other words, a touch to a particular area of the touch screen not comprising the information element, will control the displayed information element.

Figure 10:
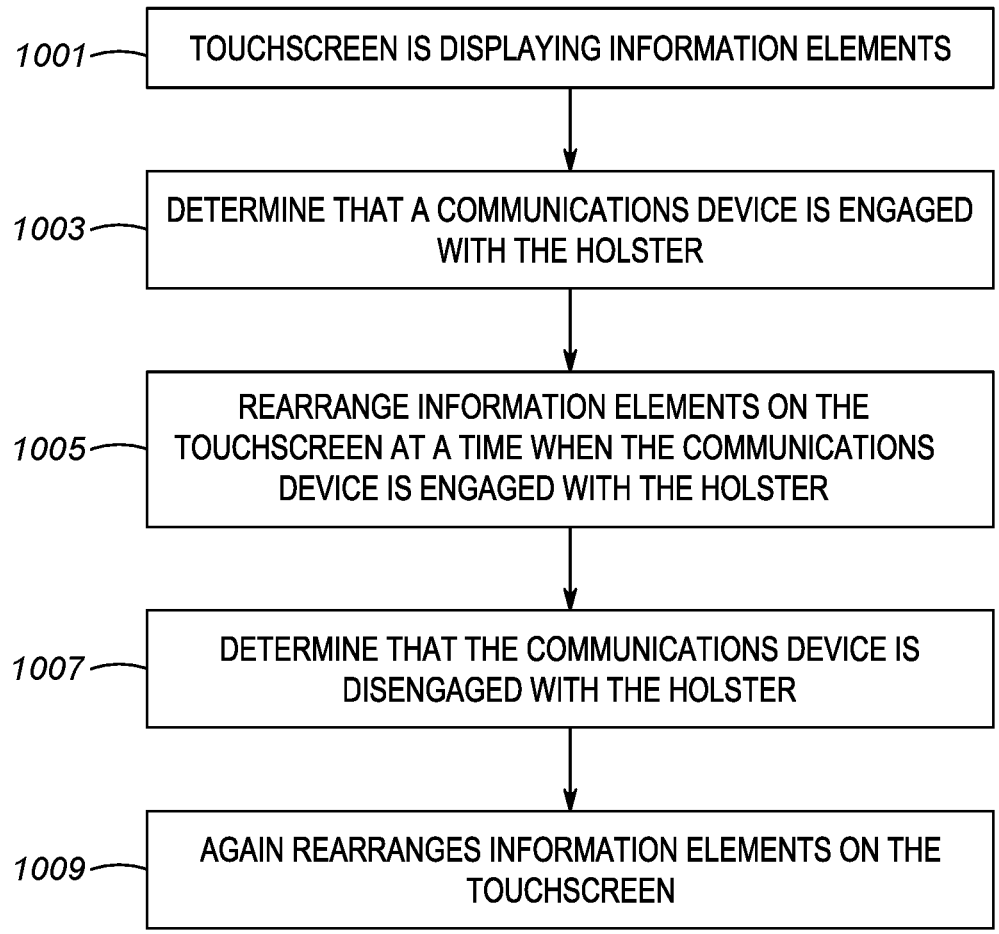
FIG. 10 is a flow chart showing operation of device Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

FIG. 10 is a flow chart showing operation of device 203. The logic flow begins at step 1001 where touchscreen 202 is displaying information elements. At step 1003, logic circuitry 703 determines that a communications device 203 is engaged with the holster. As discussed above, this determination is made by magnet 109 engaging switch 708. However, in alternate embodiments of the present invention, the determination may be made by other techniques, including, but not limited to other forms of switches detecting that communications device 203 is engaged with the holster.

As discussed above, the communications device is operated to rearrange information elements on the touchscreen at a time when the communications device is engaged with the holster (step 1005). The rearrangement may comprise moving important information elements to a particular area of the touchscreen so that they can be visible through widow 104.

At step 1007, logic circuitry 703 determines that the communications device is disengaged with the holster. As discussed above, this is accomplished by determining that switch 708 no longer detects magnet 109. Once disengaged with the holster, the communications device again rearranges information elements on the touchscreen (step 1009). The rearrangement may complies adding multiple information elements to the touchscreen that were not there when the holster and the communications device were engaged.

In other embodiments of the present invention, the communications device may be operated in a low-power state at a time when the communications device is engaged with the holster, and operated in a high-power state at a time when the communications device is disengaged with the holster.

In other embodiments of the present invention, the communications device may be operated by interpreting a touch not on an information element as a touch to engage the information element when the communications device is engaged with the holster, and operated by interpreting a touch on the information element as a touch to engage the information element when the communications device is disengaged with the holster.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
    a shell (101) configured to engage a communications device (203) and be removed from the communication device;
    a first window (103);
    a second window (104) substantially perpendicular to the first window;
    a reflecting element (105) disposed between the first and the second windows;
    a conductive runner (107) existing between the first and the second windows and terminating at a conductive pad (108), wherein the conductive pad is designed to make contact with a touchscreen (202) of the communication device when the shell is engaged to the communications device; and
    a switch trip (109) configured to engage a switch (708) on the communications device, causing the communications device to interpret a touch to a first area of the touchscreen as a touch to an information element existing on a second area of the touchscreen.

2. The apparatus of claim 1 further comprising:
    the switch trip (109) configured to engage the switch (708) on the communications device, causing the communications device to rearrange information elements on the touchscreen.

3. The apparatus of claim 1 further comprising:
    the switch trip (109) configured to engage the switch (708) on the communications device, causing the communications device to enter a low-power state.

4. The apparatus of claim 3 wherein the low-power state powers down the second area (206) of the touchscreen.

5. The apparatus of claim 4 wherein the low-power state powers down an applications processor within the communications device.

6. The apparatus of claim 1 further comprising
    the switch trip (109) configured to engage the switch (708) on the communications device, causing the communications device to interpret a touch not on an information element as a touch to engage the information element.

7. An apparatus comprising:
    a shell (101) configured to engage a communications device (203) and be removed from the communication device;
    a first window (103);
    a second window (104) substantially perpendicular to the first window;
    a reflecting element (105) disposed between the first and the second windows;
    a conductive runner (107) existing between the first and the second windows and terminating at a conductive pad (108), wherein the conductive pad is designed to make contact with a touchscreen (202) of the communication device when the shell is engaged to the communications device; and
    a switch trip (109) configured to engage a switch (708) on the communications device, causing the communications device to:
        rearrange information elements on the touchscreen;
        enter a low-power state;

interpret a touch to a first area of the touchscreen as a touch to an information element existing on a second area of the touchscreen.

8. The apparatus of claim 7 wherein the low-power state powers down the second area (206) of the touchscreen.

9. The apparatus of claim 7 wherein the low-power state powers down an applications processor within the communications device.

\* \* \* \* \*